US010100943B1

(12) United States Patent
Collins

(10) Patent No.: US 10,100,943 B1
(45) Date of Patent: Oct. 16, 2018

(54) FILLING VALVE

(71) Applicant: FEDERAL MFG. LLC, Milwaukee, WI (US)

(72) Inventor: Michael R. Collins, Wauwatosa, WI (US)

(73) Assignee: PROMACH FILLING SYSTEMS, LLC, Corona, CA (US)

( * ) Notice: Subject to any disclaimer, the term of this patent is extended or adjusted under 35 U.S.C. 154(b) by 27 days.

(21) Appl. No.: 15/067,836

(22) Filed: Mar. 11, 2016

Related U.S. Application Data

(60) Provisional application No. 62/132,843, filed on Mar. 13, 2015.

(51) Int. Cl.
*F16K 21/04* (2006.01)
*B67C 3/26* (2006.01)
*B67C 3/28* (2006.01)

(52) U.S. Cl.
CPC ............ *F16K 21/04* (2013.01); *B67C 3/2637* (2013.01); *B67C 3/282* (2013.01)

(58) Field of Classification Search
CPC ......... F17K 21/04; F16K 21/04; B67C 3/282; B67C 3/2637
USPC ........................................................... 141/57
See application file for complete search history.

(56) References Cited

U.S. PATENT DOCUMENTS 4,014,372 A 3/1977 Dichiara
4,095,628 A 6/1978 Laub, III
4,151,867 A 5/1979 Wilhere
4,442,873 A 4/1984 Yun
5,088,527 A 2/1992 Monnig
5,273,084 A 12/1993 Monnig
5,992,455 A 11/1999 Koller et al.
6,244,309 B1 6/2001 Martin
6,390,148 B2 5/2002 Martin
6,598,628 B2 7/2003 Stocchi
7,156,267 B2 1/2007 Zanga
7,287,562 B2 10/2007 Tanikawa et al.
7,308,917 B2 12/2007 Krulitsch
7,753,093 B2 * 7/2010 Jenne ........................ B67C 3/06
141/285
7,958,917 B2 6/2011 Conforti
8,418,990 B2 4/2013 Podstawka
(Continued)

OTHER PUBLICATIONS

Admitted Prior Art, 5 pages.

*Primary Examiner* — Timothy L Maust
(74) *Attorney, Agent, or Firm* — Thompson Hine LLP

(57) ABSTRACT

A valve for use in filling containers includes a valve flange, nozzle assembly and valve sleeve. The valve flange defines a first through passage. The nozzle assembly includes a liquid fill outlet and air vent outlet below the valve flange. The valve sleeve defines a second through passage and is movable between a lowered valve closed position and a raised valve open position. The valve sleeve including a first portion positioned for sliding movement within the first through passage and a second portion positioned below the valve flange and configured for sealingly closing both the liquid fill outlet and the air vent outlet when the valve sleeve is in the lowered valve closed position. The valve sleeve has a weight sufficient to cause the valve sleeve to move downward from the raised valve open position to the lowered valve closed position.

15 Claims, 4 Drawing Sheets

(56) References Cited

U.S. PATENT DOCUMENTS

| | | | | |
|---|---|---|---|---|
| 8,496,031 | B2 * | 7/2013 | Jenne | B67C 3/06 141/285 |
| 2014/0366985 | A1 * | 12/2014 | Graffin | B67C 3/04 141/286 |

* cited by examiner

FILLING VALVE

TECHNICAL FIELD

This application relates generally to valves and, more specifically, to a filling valve used to fill containers such as bottles or jugs.

BACKGROUND

Filling valves are used in bottling systems that deliver bottles or other containers along a conveyance path and then beneath the filling valve so that liquid can be delivered into the bottles. In one known valve type a spring or other biasing member is used to urge a movable valve part known as the valve sleeve into a lowered closed position. Unfortunately, the spring or other biasing member makes it difficult to clean the valve.

It would be desirable to provide a filling valve that is better suited to being cleaned in place.

SUMMARY

In one aspect, a valve for use in filling containers includes a valve flange, a nozzle assembly and a valve sleeve. The valve flange defines a first through passage. The nozzle assembly includes a nozzle head defining at least one liquid fill outlet and at least one air vent outlet, the air vent outlet connected to a vent tube that passes upward through the first through passage, the nozzle head spaced below the valve flange. The valve sleeve defines a second through passage, and includes a first portion positioned for sliding movement within the first through passage as the valve sleeve moves between a lowered valve closed position and a raised valve open position. The valve sleeve includes a second portion positioned below the valve flange and configured for sealingly mating with the nozzle head to close both the liquid fill outlet and the air vent outlet when the valve sleeve is in the lowered valve closed position. The second through passage is in communication with the liquid fill outlet of the nozzle head so that liquid can pass downward along the first through passage, into and along the second through passage and to and out of the liquid fill outlet when the valve sleeve is in the raised valve open position. The valve sleeve has a weight sufficient to cause the valve sleeve to move downward from the raised valve open position to the lowered valve closed position under the force of gravity and without requiring any biasing member between the valve flange and the valve sleeve.

In another aspect, a valve for use in filling containers includes a valve flange, nozzle assembly and valve sleeve. The valve flange defines a first through passage. The nozzle assembly includes a liquid fill outlet and air vent outlet below the valve flange. The valve sleeve defines a second through passage and is movable between a lowered valve closed position and a raised valve open position. The valve sleeve including a first portion positioned for sliding movement within the first through passage and a second portion positioned below the valve flange and configured for sealingly closing both the liquid fill outlet and the air vent outlet when the valve sleeve is in the lowered valve closed position. The valve sleeve has a weight sufficient to cause the valve sleeve to move downward from the raised valve open position to the lowered valve closed position in no more than 0.66 seconds under the force of gravity and without requiring any biasing member between the valve flange and the valve sleeve.

In a further aspect, a method of operating a filling valve includes: utilizing a valve sleeve disposed partially within a valve flange for movement between a lowered valve closed position and a raised valve open position; moving a container upward into contact with the valve so that the movement of the container causes the valve flange to move from the lowered valve closed position to the raised valve open position; and moving the container downward away from the valve so that gravity acts on the valve sleeve to move the valve sleeve from the raised valve open position to the lowered valve closed position without the use of any biasing member to push the valve sleeve downward.

DETAILED DESCRIPTION

Figure 1A:
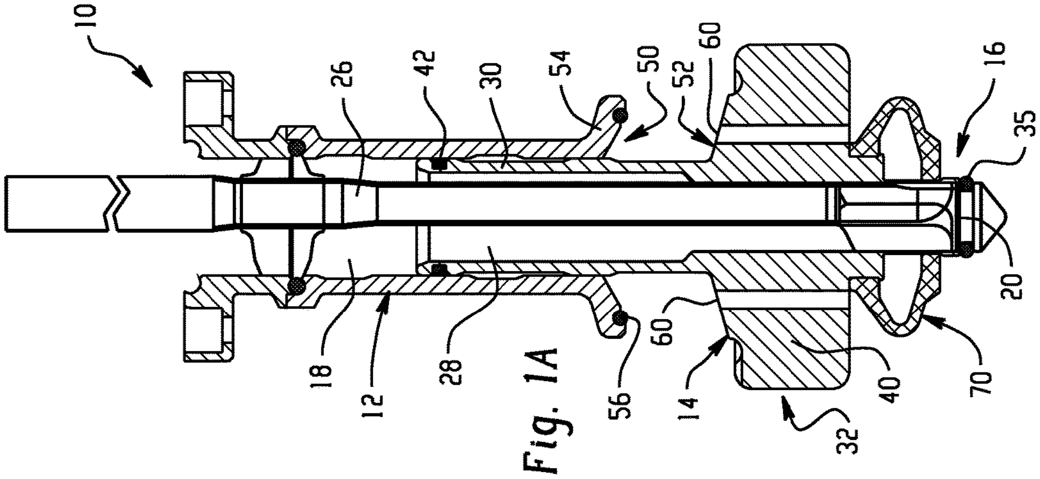
FIGS. 1A-1C show one embodiment of a filling valve in closed, open and flush conditions.
Figure 1B:
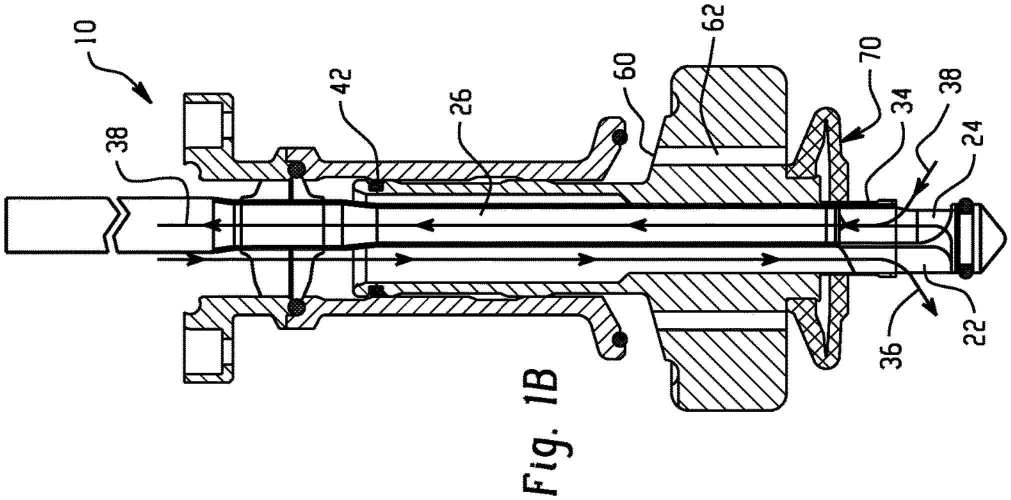
Figure 1C:
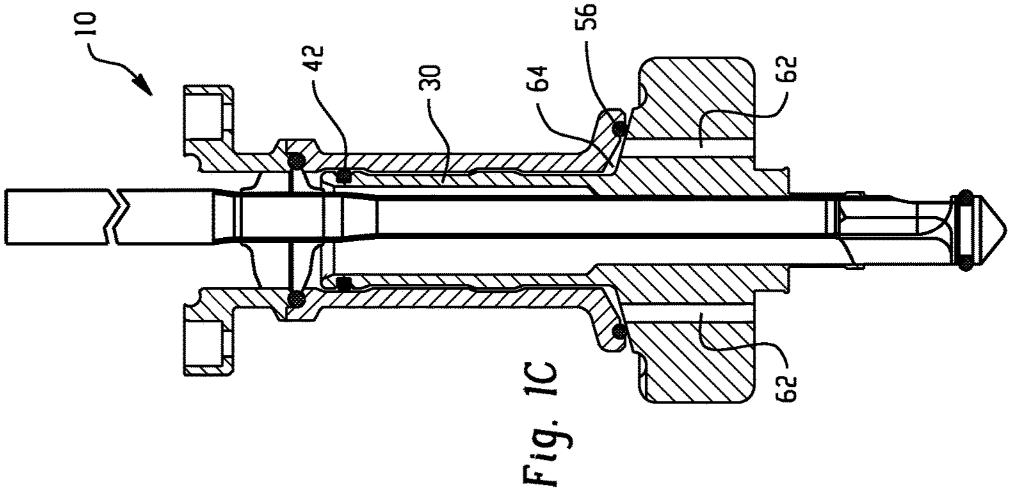

One embodiment of a filling valve 10 shown in FIGS. 1A-1C includes a valve flange 12, a valve sleeve 14 and a nozzle assembly 16. The valve flange defines a through passage 18. The nozzle assembly 16 includes a nozzle head 20 defining at least one liquid fill outlet 22 and at least one air vent outlet 24. The air vent outlet 24 connects to a vent tube 26 that passes upward through the passage 18. The nozzle head 20 is spaced below the valve flange 12.

The valve sleeve 14 defines a through passage 28 that is aligned with and partially within the passage 18. The valve sleeve includes an upper portion 30 positioned for sliding movement within the through passage 18 as the valve sleeve moves between a lowered valve closed position (per FIG. 1A) and a raised valve open position (per FIG. 1B). The valve sleeve 14 includes a lower portion 32 positioned below the valve flange 12 and configured for sealingly mating with the nozzle head 20 to close both the liquid fill outlet 22 and the air vent outlet 24 when the valve sleeve is in the lowered valve closed position. In particular, the lower portion 32 of the valve sleeve includes a lower cylindrical extent 34 that engages an a seal member 35 for the sealing purpose.

As indicated, the through passage 28 is in fluid communication with the liquid fill outlet 22 of the nozzle head so that liquid can pass downward along the through passage 18, into and along the through passage 28 and to and out of the liquid fill outlet 22 when the valve sleeve is in the raised valve open position, as reflected by the arrows 36 in FIG. 1B. As the liquid is flowing into a container (not shown), air within the container escapes by passing upward through the air vent outlet 24 and then up the vent tube 26 per the arrows 38.

Notably, the valve sleeve 14 has a weight that is sufficient to cause the valve sleeve 14 to move downward from the raised valve open position to the lowered valve closed position under the force of gravity and without requiring any biasing member between the valve flange and the valve sleeve, and without using any powered actuator to assist the downward movement. By way of example, in the illustrated embodiment this weight feature is achieved by providing an enlarged sleeve body portion 40 just above the cylindrical extent 34. The exact weight of the valve sleeve required to achieve suitable operation may vary depending upon a number of factors, particularly the level of sliding resistance between the valve sleeve and the valve flange.

In the illustrated embodiment an exterior surface of the upper portion 30 of the valve sleeve 14 and an interior surface of the through passage 18 are cooperatively configured for sealing contact with each other as the valve sleeve 14 moves between the lowered valve closed position and the raised valve open position, and visa versa. This sealing contact may be achieved in part by the use of an o-ring 42 or other seal member in a recess of the outer surface of the upper portion 30 as well as little or no spacing between the wall portions forming the outer surface and the wall surface defining the passage 18. Regardless of the exact configuration, the weight of the valve sleeve 14 should be sufficient to overcome any frictional forces caused by the sealing contact between the surfaces.

The valve sleeve 14 is also movable to a valve flush position (per FIG. 1C) that is higher than the raised valve open position of FIG. 1B. As shown in FIG. 1C, when the valve sleeve 14 is in the valve flush position the exterior surface of the upper portion 30 of the valve sleeve 14 and the interior surface of the through passage 18 are cooperatively configured to eliminate the sealing contact (e.g., a slight spacing is provided between the surfaces along the full length of surface of overlap is provided, and the o-ring 42 is also spaced from the interior surface of the through passage 18), thereby enabling liquid to pass between the valve sleeve and the valve flange for valve cleaning. In this regard, the valve flange 12 includes a downwardly facing surface portion 50 at its lower end, and the lower portion 30 of the valve sleeve 14 includes an upwardly facing surface portion 52 that is moved into sealing contact with the downwardly facing surface portion 50 when the valve sleeve 14 is in the valve flush position. In the illustrated embodiment, the downwardly facing surface portion 50 is formed on a an enlarged diameter lower segment 54 that includes an annular seal member 56 disposed in a recess outward of and about the lower end of the through passage 18, and the upwardly facing surface portion 52 moves into contact with the annular seal member 56 when the valve sleeve 14 is in the valve flush position.

The valve sleeve includes one or more ports 60 located on the upwardly facing surface portion 52 and positioned radially inward of the annular seal member 56. Each port 60 is connected to a fluid passage 62 by which cleaning fluid under pressure can be delivered upward through the valve sleeve 14, into a space 64 between the upwardly facing surface portion and the downwardly facing surface portion, and then upward between the exterior surface of the upper portion 30 of the valve sleeve 14 and the interior surface of the through passage 18.

Figure 2A:
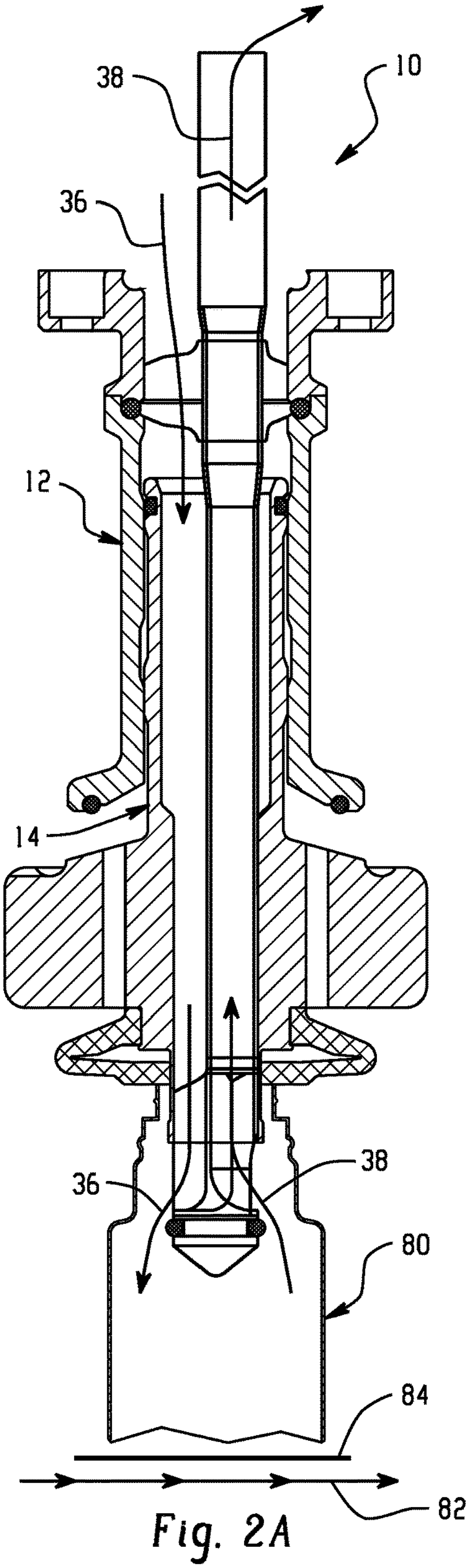
FIGS. 2A-2B show the valve of FIGS. 1A-1C in operation with a bottle and in a flush flow respectively.

An expandable rubber sealing member 70 may also be disposed on a lower end of the valve sleeve 14 for making sealing contact with an upper rim of a container being filled by the valve. As shown in FIG. 1B the sealing member may be flexible and compress when contacted by a container rim. In this regard, FIG. 2A shows a bottle profile 80 in position to be filled, along with corresponding product inflow 36 and air outflow 38. The bottle conveying system (shown only schematically as arrow path 82) that moves the bottle into position for filling may operate to push the bottle upward into the sealing member 70 to both compress the sealing member 70 and move the valve sleeve into the raised valve open position.

By way of example, a filling machine may include a plurality of the valves 10, each valve mounted with its valve flange fixed to the machine and its nozzle assembly having a fixed position relative to the valve flange. The valve sleeve of each valve is supported by its corresponding nozzle head when in the lowered valve closed position and is slidable upward to the raised valve open position by a container 80 to be filled by the valve. The container 80 may be moved upward by a lift plate 84 spaced below the valve and forming part of the conveying system 82. By way of example, the valves could be arranged linearly in sequence or about an arcuate or other curved path, or some combination of the two.

Figure 2B:
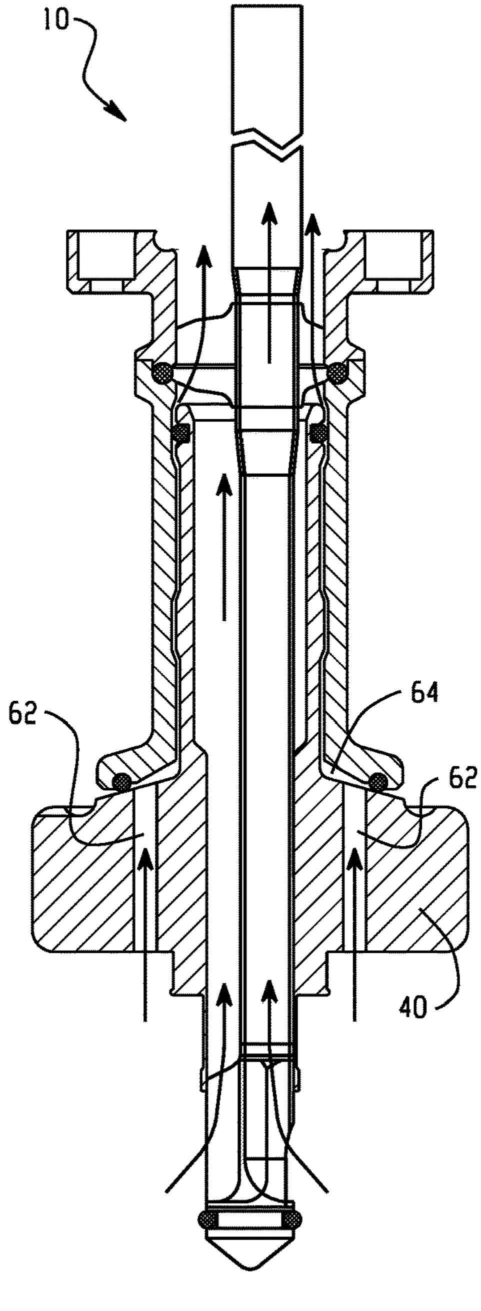

The flow during valve flush is represented by the arrows in FIG. 2B. A suitable mechanism may mounted to the valve or sleeve or pressed against the bottom surface 72 to enable the pressurized cleaning liquid to be delivered into the valve.

Figures 3A, 3B, 3C:
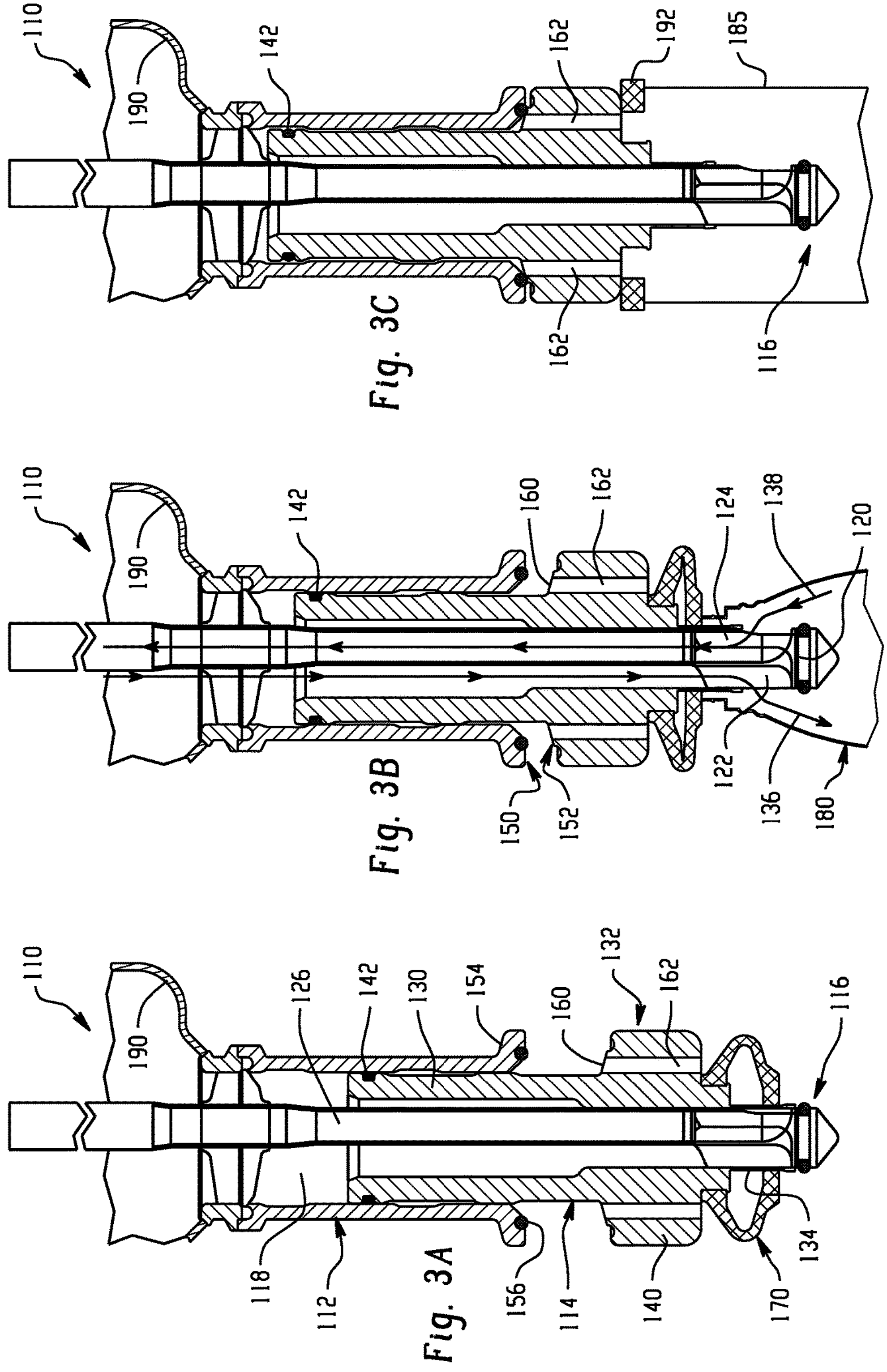
FIGS. 3A-3C show another embodiment of a filling valve in closed, open and flush conditions.

Referring now to FIGS. 3A-3C, another embodiment of a valve 110 is shown, including a valve flange 112, valve sleeve 114 and nozzle assembly 116. The valve flange defines a through passage 118. The nozzle assembly 116 includes a nozzle head 120 defining at least one liquid fill outlet 122 and at least one air vent outlet 124. The air vent outlet 124 connects to a vent tube 126 that passes upward through the through passage 118. The nozzle head 120 is spaced below the valve flange 112. Components of valve 110 similar to those of valve 10 are similarly numbered, but with a preceding 1 designation.

The valve sleeve 114 includes upper portion 130 and lower portion 132, with a lower cylindrical extent 134 that closes the outlets 122 and 124 of the nozzle head when the valve sleeve is in the lowered position. Exemplary liquid inflow 136 (e.g., from a liquid hopper 190 atop the valve) and air outflow 138 is shown in FIG. 3B when a bottle 180 has moved the valve sleeve 114 into its raised valve open position. The lower portion 132 of the valve sleeve includes enlarged section 140 with ports 160 and passages 162 used for valve flushing when the valve sleeve is in the fully raised position of FIG. 3C that moves surface 152 into sealing contact with surface 152 of lower extent 154 of the valve flange 112 (by way of o-ring 156). FIG. 3C also shows a sealing rubber 192 that may be used during valve cleaning, and a flush component 185 used to deliver the liquid under pressure.

Figure 4:
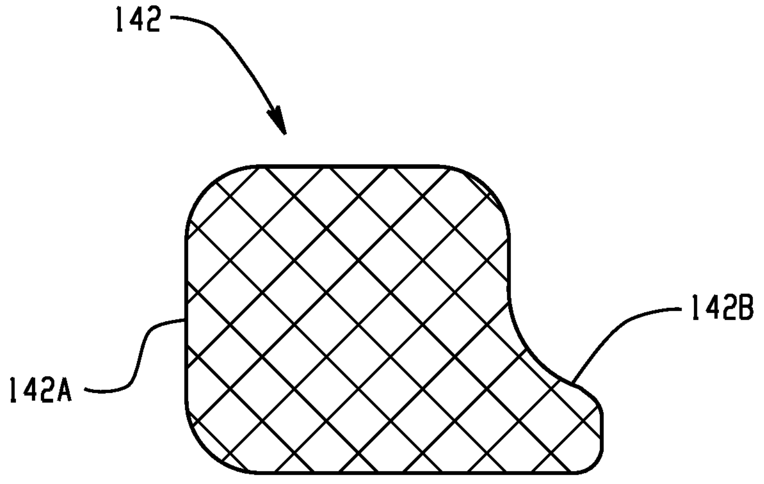
FIG. 4 shows one embodiment of a dynamic seal cross-section.

Notably, in the valve 110 the lower portion 132 of the valve sleeve 114 is smaller than that of valve 10. In this regard, by configuring the seal 142 to provide lesser friction it is possible to reduce the weight required to move the valve sleeve 114 downward under the force of gravity alone. In this regard, reference is made to the schematic of FIG. 4 which shows a cross-section of one potential embodiment of a dynamic seal 142, where the seal includes a seating side 142A for seating in an annular recess and a wiping side 142B that protrudes from the recess and slidingly engages the interior surface of the valve flange. This dynamic, wiping type seal member aids in reducing the friction, thereby reducing the necessary weight of the valve sleeve 114.

In general, the valve sleeve should be configured to provide sufficient motive force under gravity alone to close the valve when there is no bottle present, overcoming the dynamic friction of the seal ring, and should also provide enough downward force against the bottle to maintain an air-tight seal on the bottle during bottle fill. Sufficient operating speed of the valve is also desirable. In this regard, in certain embodiments the flange, sleeve and seal may be configured to achieve an operation in which the valve sleeve moves downward from the raised valve open position to the lowered valve closed position by a distance of at least about 0.50 inches in a time period of no more than about 0.66 seconds (e.g., such as 0.60 inches in a time period of no more than 0.60 seconds, or 0.70 inches in a time period of no more than about 0.55 seconds). These speeds enable relatively high speed and sequential bottle fill operations and can be achieved using a valve sleeve of no more than 7 pounds in certain embodiments.

It is to be clearly understood that the above description is intended by way of illustration and example only, is not intended to be taken by way of limitation, and that other changes and modifications are possible.

What is claimed is:

1. A valve for use in filling containers, comprising:

a valve flange defining a first through passage;

a nozzle assembly including a nozzle head defining at least one liquid fill outlet on a lateral side of the nozzle head and at least one air vent outlet on a lateral side of the nozzle head, the air vent outlet connected to a vent tube that passes upward through the first through passage, the nozzle head spaced below the valve flange;

a valve sleeve defining a second through passage, the valve sleeve including a first portion positioned for sliding movement within the first through passage as the valve sleeve moves between a lowered valve closed position and a raised valve open position, the valve sleeve including a second portion positioned below the valve flange and configured for sealingly mating with the nozzle head to close both the liquid fill outlet and the air vent outlet when the valve sleeve is in the lowered valve closed position, the second through passage in communication with the liquid fill outlet of the nozzle head so that liquid can pass downward along the first through passage, into and along the second through passage and to and out of the liquid fill outlet when the valve sleeve is in the raised valve open position, wherein when the valve sleeve is in the lowered valve closed position a lower part of the second portion surrounds the nozzle head to cover both the liquid fill outlet and the air vent outlet and when the valve sleeve is in raised valve open position the lower part of second portion is raised above the nozzle head;

wherein the valve sleeve has a weight sufficient to cause the valve sleeve to move downward from the raised valve open position to the lowered valve closed position under the force of gravity and without requiring any biasing member between the valve flange and the valve sleeve, wherein the weight of the valve sleeve is sufficient to overcome frictional forces between the valve flange and the first portion of the valve sleeve.

2. The valve of claim 1 wherein an exterior surface of the first portion of the valve sleeve and an interior surface of the first through passage are cooperatively configured for sealing contact as the valve sleeve moves between the lowered valve closed position and the raised valve open position.

3. A valve for use in filling containers, comprising:

a valve flange defining a first through passage;

a nozzle assembly including a nozzle head defining at least one liquid fill outlet and at least one air vent outlet, the air vent outlet connected to a vent tube that passes upward through the first through passage, the nozzle head spaced below the valve flange;

a valve sleeve defining a second through passage, the valve sleeve including a first portion positioned for sliding movement within the first through passage as the valve sleeve moves between a lowered valve closed position and a raised valve open position, the valve sleeve including a second portion positioned below the valve flange and configured for sealingly mating with the nozzle head to close both the liquid fill outlet and the air vent outlet when the valve sleeve is in the lowered valve closed position, the second through passage in communication with the liquid fill outlet of the nozzle head so that liquid can pass downward along the first through passage, into and along the second through passage and to and out of the liquid fill outlet when the valve sleeve is in the raised valve open position;

wherein the valve sleeve has a weight sufficient to cause the valve sleeve to move downward from the raised valve open position to the lowered valve closed position under the force of gravity and without requiring any biasing member between the valve flange and the valve sleeve;

wherein an exterior surface of the first portion of the valve sleeve and an interior surface of the first through passage are cooperatively configured for sealing contact as the valve sleeve moves between the lowered valve closed position and the raised valve open position;

wherein the weight of the valve sleeve is sufficient to overcome frictional forces caused by the sealing contact, wherein the sealing contact is achieved by a dynamic seal member including a seating side seated in an annular recess and a wiping side that slidingly engages the exterior surface or the interior surface.

4. The valve of claim 3 wherein the recess is located on the exterior surface of the valve sleeve and the wiping side of the dynamic seal member flexes in a direction opposite a direction of movement of the valve sleeve.

5. The valve of claim 1 wherein the valve sleeve is movable to a valve flush position that is higher than the raised valve open position, when the valve sleeve is in the valve flush position the exterior surface of the first portion of the valve sleeve and the interior surface of the first through passage are cooperatively configured to eliminate the sealing contact and to enable liquid to pass therebetween for valve cleaning.

6. A valve for use in filling containers, comprising:

a valve flange defining a first through passage;

a nozzle assembly including a nozzle head defining at least one liquid fill outlet and at least one air vent outlet, the air vent outlet connected to a vent tube that passes upward through the first through passage, the nozzle head spaced below the valve flange;

a valve sleeve defining a second through passage, the valve sleeve including a first portion positioned for sliding movement within the first through passage as the valve sleeve moves between a lowered valve closed position and a raised valve open position, the valve sleeve including a second portion positioned below the valve flange and configured for sealingly mating with the nozzle head to close both the liquid fill outlet and the air vent outlet when the valve sleeve is in the lowered valve closed position, the second through passage in communication with the liquid fill outlet of the nozzle head so that liquid can pass downward along the first through passage, into and along the second through passage and to and out of the liquid fill outlet when the valve sleeve is in the raised valve open position;

wherein the valve sleeve has a weight sufficient to cause the valve sleeve to move downward from the raised valve open position to the lowered valve closed position under the force of gravity and without requiring any biasing member between the valve flange and the valve sleeve;

wherein the valve sleeve is movable to a valve flush position that is higher than the raised valve open position, when the valve sleeve is in the valve flush position the exterior surface of the first portion of the valve sleeve and the interior surface of the first through passage are cooperatively configured to eliminate the sealing contact and to enable liquid to pass therebetween for valve cleaning;

wherein the valve flange includes a downwardly facing surface portion at its lower end, wherein the second portion of the valve sleeve includes an upwardly facing surface portion that is moved into sealing contact with the downwardly facing surface portion when the valve sleeve is in the valve flush position.

7. The valve of claim 6 wherein the downwardly facing surface portion includes an annular seal member disposed outward of and about the lower end of the first through passage, and the upwardly facing surface portion moves into contact with the annular seal member when the valve sleeve is in the valve flush position.

8. The valve of claim 7 wherein the valve sleeve includes one or more ports on the upwardly facing surface portion and located inward of the annular seal member, each port connected to a fluid passage by which cleaning fluid under pressure can be delivered through the valve sleeve, into a space between the upwardly facing surface portion and the downwardly facing surface portion and then upward between the exterior surface of the first portion of the valve sleeve and the interior surface of the first through passage.

9. The valve of claim 1 further comprising an expandable rubber sealing member is disposed on a lower end of the valve sleeve for making sealing contact with an upper rim of a container being filled by the valve.

10. A filling machine including a plurality of valves according to claim 1, each valve mounted with the valve flange fixed to the machine, the nozzle assembly having a fixed position relative to the valve flange, and the valve sleeve supported by the nozzle head when in the lowered valve closed position and slidable upward to the raised valve open position by a container to be filled by the valve, the container movable upward by a lift plate spaced below the valve.

11. A valve for use in filling containers, comprising:

a valve flange defining a first through passage;

a nozzle assembly including a liquid fill outlet and air vent outlet below the valve flange;

a valve sleeve defining a second through passage, the valve sleeve movable between a lowered valve closed position and a raised valve open position, the valve sleeve including a first portion positioned for sliding movement within the first through passage and a second portion positioned below the valve flange and configured for sealingly closing both the liquid fill outlet and the air vent outlet when the valve sleeve is in the lowered valve closed position;

wherein the valve sleeve has a weight sufficient to cause the valve sleeve to move downward from the raised valve open position to the lowered valve closed position in no more than 0.66 seconds under the force of gravity and without requiring any biasing member between the valve flange and the valve sleeve, wherein the weight of the valve sleeve is sufficient to overcome frictional forces between an outer surface of the first portion of the valve sleeve and an inner surface of the first through passage.

12. The valve of claim 11 wherein a dynamic seal member is provided between the inner surface of the first through passage and the outer surface of the first portion of the valve sleeve.

13. The valve of claim 12 wherein the dynamic seal includes a seating side seated in an annular recess and a wiping side projecting outward from the annular recess.

14. The valve of claim 13 wherein the wiping side has a configuration that is non-arcuate.

15. A filling machine including a plurality of valves according to claim 11, each valve mounted with the valve flange fixed to the machine, the nozzle assembly having a fixed position relative to the valve flange, and the valve sleeve supported by the nozzle assembly when in the lowered valve closed position and slidable upward to the raised valve open position by a container to be filled by the valve, the container movable upward by a lift plate spaced below the valve.

* * * * *